United States Patent
Yamashita et al.

(10) Patent No.: US 12,228,979 B2
(45) Date of Patent: Feb. 18, 2025

(54) IMAGE DISPLAY DEVICE

(71) Applicant: PANASONIC INTELLECTUAL PROPERTY MANAGEMENT CO., LTD., Osaka (JP)

(72) Inventors: Shuji Yamashita, Nara (JP); Ichiro Okuda, Osaka (JP); Chiharu Matsukawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 563 days.

(21) Appl. No.: 17/273,691

(22) PCT Filed: Apr. 20, 2020

(86) PCT No.: PCT/JP2020/017119
§ 371 (c)(1),
(2) Date: Mar. 4, 2021

(87) PCT Pub. No.: WO2020/218266
PCT Pub. Date: Oct. 29, 2020

(65) Prior Publication Data
US 2021/0311533 A1    Oct. 7, 2021

(30) Foreign Application Priority Data

Apr. 22, 2019   (JP) ................. 2019-081220

(51) Int. Cl.
*G06F 1/18*   (2006.01)
(52) U.S. Cl.
CPC ................. *G06F 1/182* (2013.01)

(58) Field of Classification Search
CPC ................................ G06F 1/1698
See application file for complete search history.

(56) References Cited

U.S. PATENT DOCUMENTS

| | | | |
|---|---|---|---|
| 6,842,335 B1* | 1/2005 | Hanson | G06F 1/1656 |
| | | | 361/679.56 |
| 2002/0013160 A1* | 1/2002 | Harano | H01Q 1/2258 |
| | | | 343/702 |

(Continued)

FOREIGN PATENT DOCUMENTS

| | | |
|---|---|---|
| EP | 2800360 A1 | 11/2014 |
| JP | 2007-124555 A | 5/2007 |

(Continued)

OTHER PUBLICATIONS

Extended European Search Report dated Apr. 8, 2022 issued in the corresponding European Patent Application No. 20794043.8.

(Continued)

*Primary Examiner* — Nan-Ying Yang
(74) *Attorney, Agent, or Firm* — Rimon P.C.

(57) ABSTRACT

An image display device according to an embodiment includes: a display panel which displays an image on a front surface of the display panel; an antenna unit which is positioned in front of the front surface of the display panel; and a front wall which accommodates the antenna unit. For example, the antenna unit overlaps the display panel in a front-back direction. For example, the front wall is disposed along a lower edge of the display panel, and protrudes forward relative to the display panel.

6 Claims, 11 Drawing Sheets

(56) References Cited

U.S. PATENT DOCUMENTS

| | | | | |
|---|---|---|---|---|
| 2004/0051670 A1* | 3/2004 | Sato | .................. | H01Q 13/10 |
| | | | | 343/702 |
| 2004/0209646 A1* | 10/2004 | Murayama | ............ | G06F 1/1683 |
| | | | | 455/556.1 |
| 2007/0035455 A1* | 2/2007 | Tseng | .................. | G06F 1/1698 |
| | | | | 343/702 |
| 2007/0216582 A1* | 9/2007 | Cheng | .................... | H01Q 1/38 |
| | | | | 343/702 |
| 2008/0258990 A1* | 10/2008 | Burrell | ................ | H01Q 21/28 |
| | | | | 343/835 |
| 2013/0107136 A1* | 5/2013 | Tamura | .................. | H04N 5/64 |
| | | | | 348/836 |
| 2019/0074576 A1* | 3/2019 | Bae | .................. | H01Q 1/243 |

FOREIGN PATENT DOCUMENTS

| | | |
|---|---|---|
| JP | 2009-094864 A | 4/2009 |
| JP | 2009-267977 A | 11/2009 |
| KR | 10-2015-0033398 A | 4/2015 |
| WO | 2018/139111 A1 | 8/2018 |

OTHER PUBLICATIONS

International Search Report and Witten Opinion issued on Jul. 14, 2020 in International Patent Application No. PCT/JP2020/017119; with partial English translation.

* cited by examiner

IMAGE DISPLAY DEVICE

CROSS-REFERENCE OF RELATED APPLICATIONS

This application is the U.S. National Phase under 35 U.S.C. § 371 of International Patent Application No. PCT/JP2020/017119, filed on Apr. 20, 2020, which in turn claims the benefit of Japanese Application No. 2019-081220, filed on Apr. 22, 2019, the entire disclosures of which Applications are incorporated by reference herein.

TECHNICAL FIELD

The present disclosure relates to an image display device including an antenna unit.

BACKGROUND ART

Patent Literature (PTL) 1 discloses a liquid crystal television including a slot antenna. In the liquid crystal television, the slot antenna is accommodated in a conductive component above the liquid crystal panel, so that radio waves emitted from an external interrogator are received by the slot antenna.

CITATION LIST

Patent Literature

[PTL 1] Japanese Unexamined Patent Application Publication No. 2007-124555

SUMMARY OF INVENTION

Technical Problem

The present disclosure provides an image display device capable of improving the reception performance.

Solution to Problem

An image display device according to the present disclosure includes: a display panel which displays an image on the front surface of the display panel; an antenna unit positioned in front of the front surface of the display panel; and a non-conductive component which accommodates the antenna unit.

Advantageous Effects of Invention

An image display device according to the present disclosure is capable of improving the reception performance.

DESCRIPTION OF EMBODIMENTS

The inventors of the present application have found the following problem in the conventional liquid crystal television. In the conventional liquid crystal television, a slot antenna is accommodated in a conductive component above the liquid crystal panel. This leads to reduced reception performance.

The present disclosure has been conceived in view of the above finding. As a result of intensive studies by the inventors of the present application, the inventors have arrived at an idea of a configuration of an image display device capable of improving the reception performance.

Hereinafter, embodiments will be described with reference to the drawings, as necessary. Note that unnecessarily detailed descriptions may be omitted. For example, detailed descriptions of already known matters and overlapping description of substantially the same configuration may be omitted. This is to avoid the following description to become unnecessarily redundant, and to facilitate understanding of the person skilled in the art. Note that the drawings are represented schematically and are not necessarily precise illustrations.

The inventors of the present application provide the accompanying drawings and the following description so that the person skilled in the art fully understands the present disclosure, and do not intend to limit the subject matter of the claims by this.

Moreover, in the following embodiments, the top-bottom direction is represented by the Z-axis, the front-back direction is represented by the Y-axis, and the left-right direction is represented by the X-axis for the sake of description, but these do not limit the orientation of the image display device according to the present disclosure at the time of manufacture or usage. In the following descriptions, for example, the positive X-axis side indicates the direction of the arrow of the X-axis and the negative X-axis side indicates the direction opposite to the positive X-axis side. The same applies to the Y-axis and the Z-axis.

Moreover, in the following embodiments, language such as parallel or perpendicular may be used to indicate the relative orientation of two directions, but this includes a case where the orientation is not as exactly stated. For example, "two directions are parallel" includes, in addition to exactly parallel, substantially parallel, that is to say, for example, includes a margin of error of about a few percent, unless otherwise noted.

Hereinafter, embodiments will be described with reference to the drawings.

Embodiment 1

First, Embodiment 1 will be described.

Figure 1:
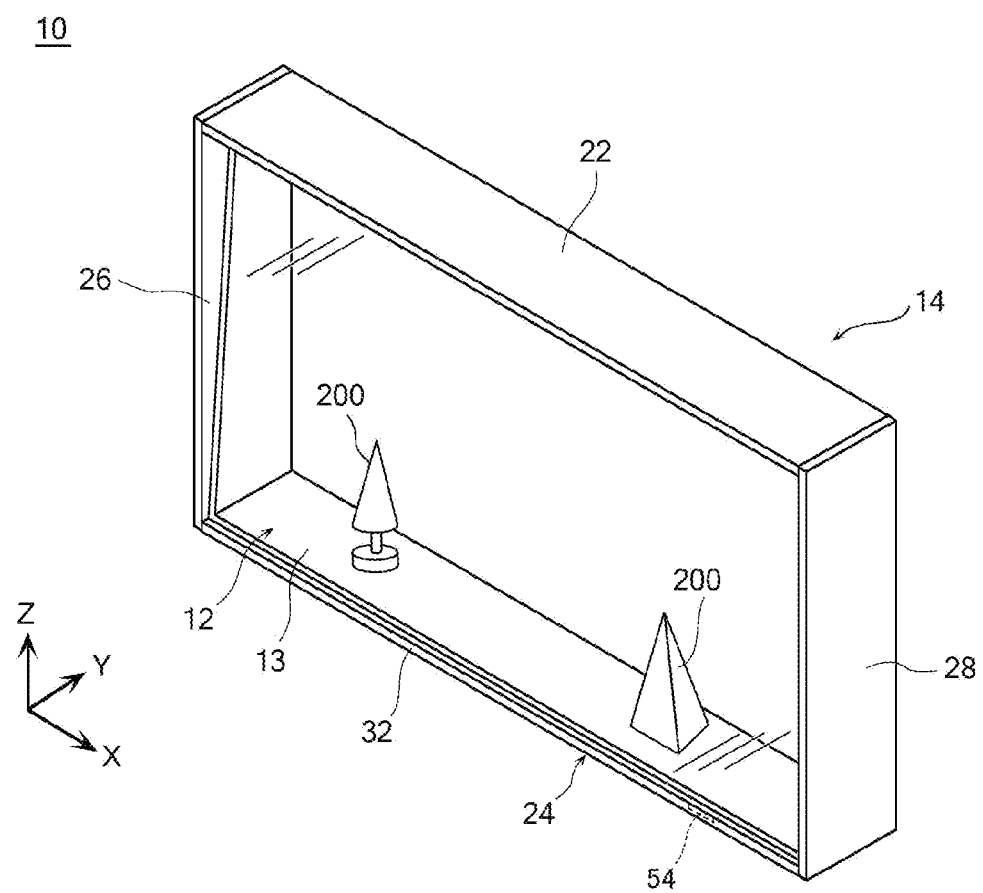
FIG. 1 is an external perspective view of a state of an image display device according to Embodiment 1 when operating in a first transmissive mode.
Figure 2:
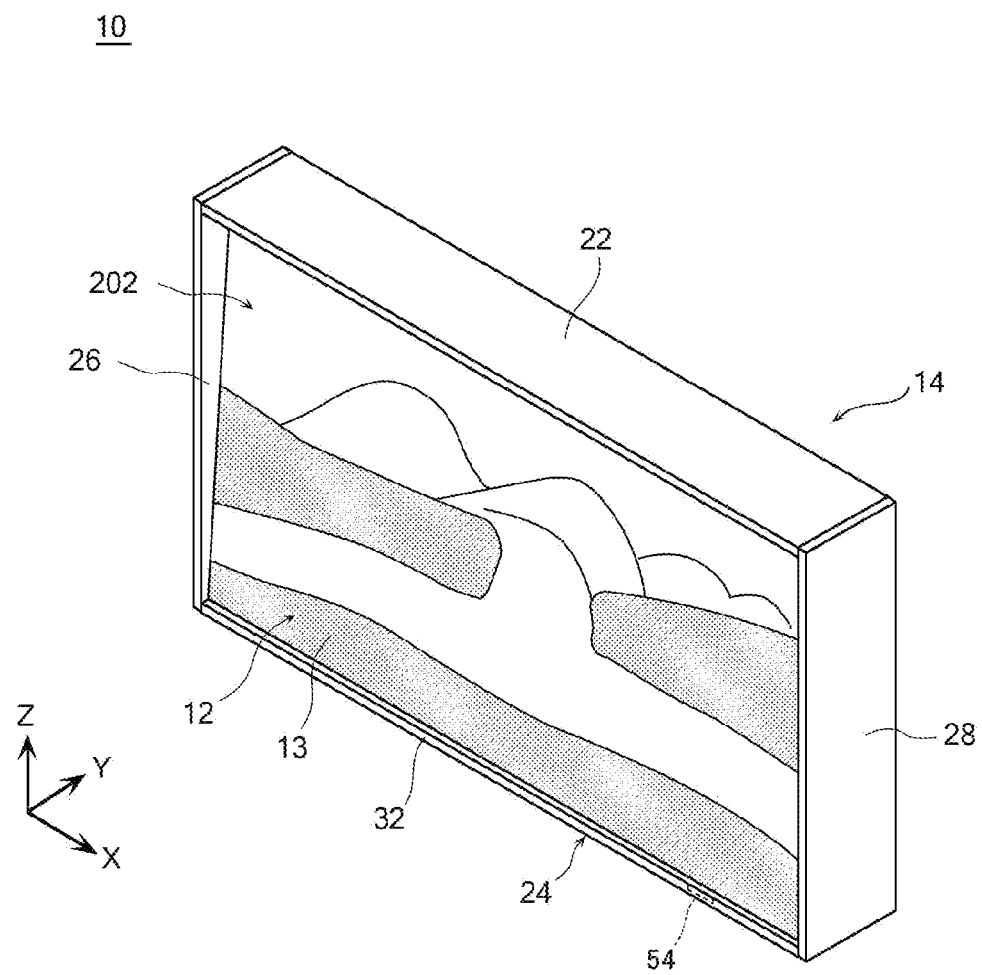
FIG. 2 is an external perspective view of a state of the image display device according to Embodiment 1 when operating in an image display mode.
Figure 3:
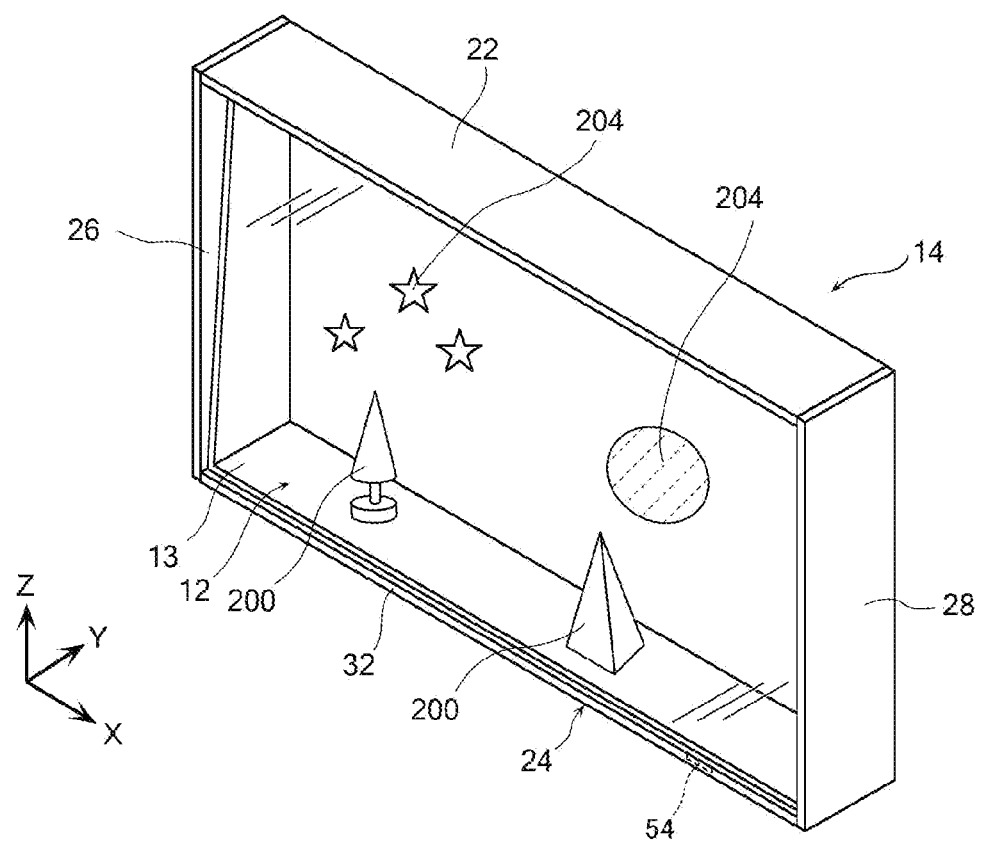
FIG. 3 is an external perspective view of a state of the image display device according to Embodiment 1 when operating in a second transmissive mode.
Figure 4:
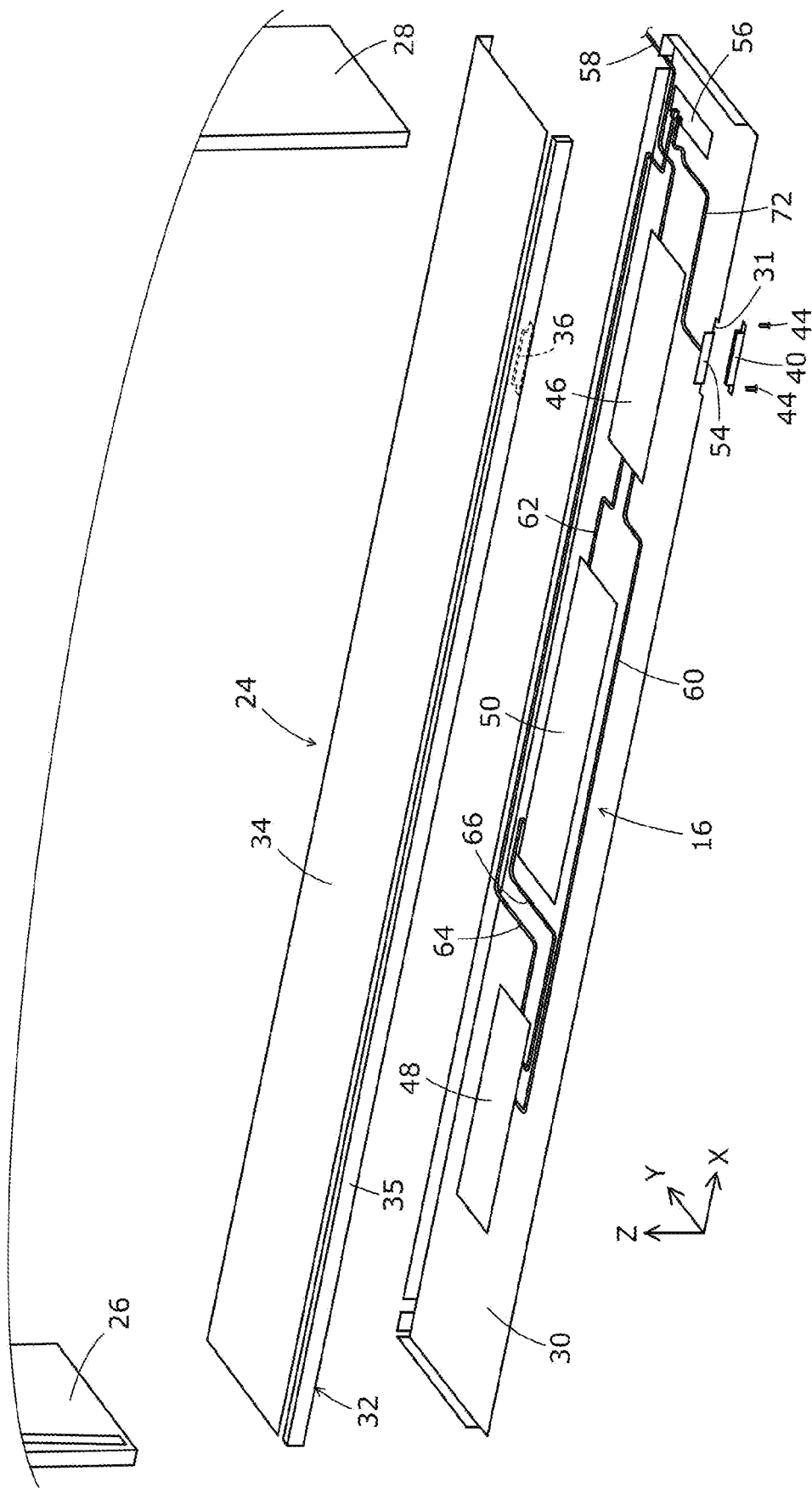
FIG. 4 is an exploded perspective view of a portion in proximity to a lower plate of the image display device according to Embodiment 1.
Figure 5:
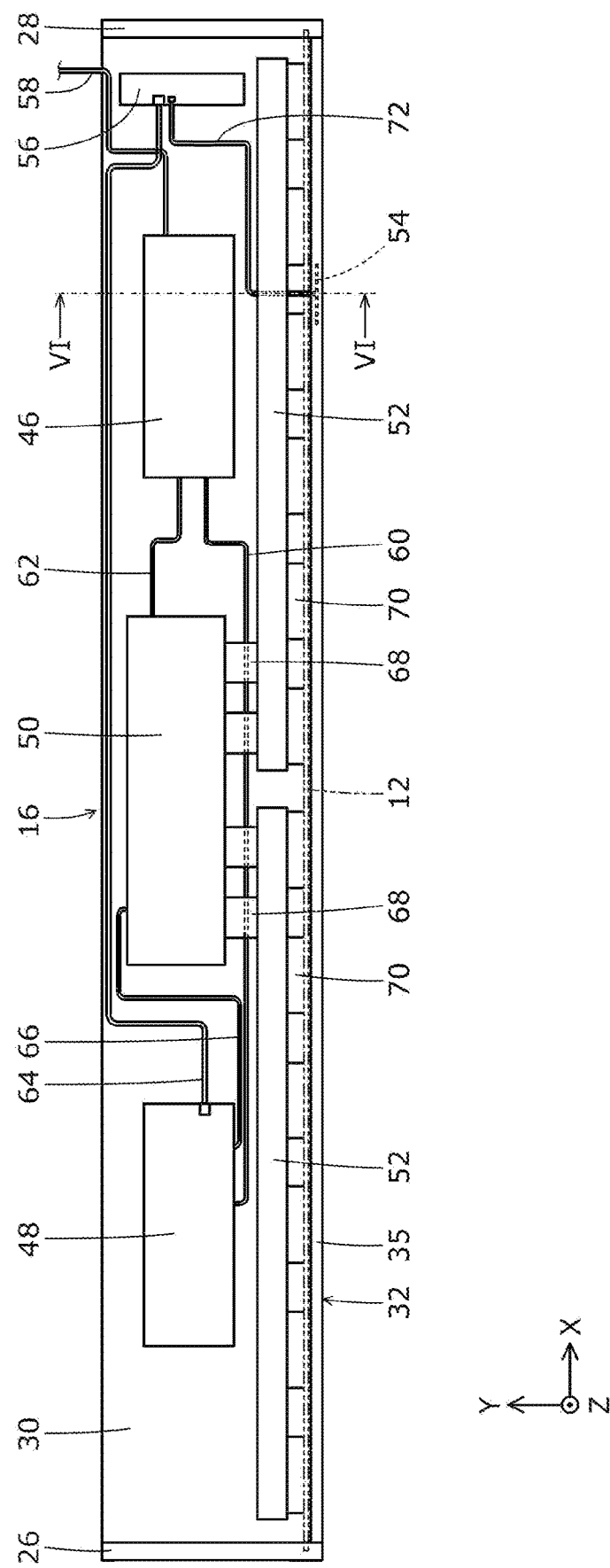
FIG. 5 is a plan view of a controller of the image display device according to Embodiment 1.
Figure 6:
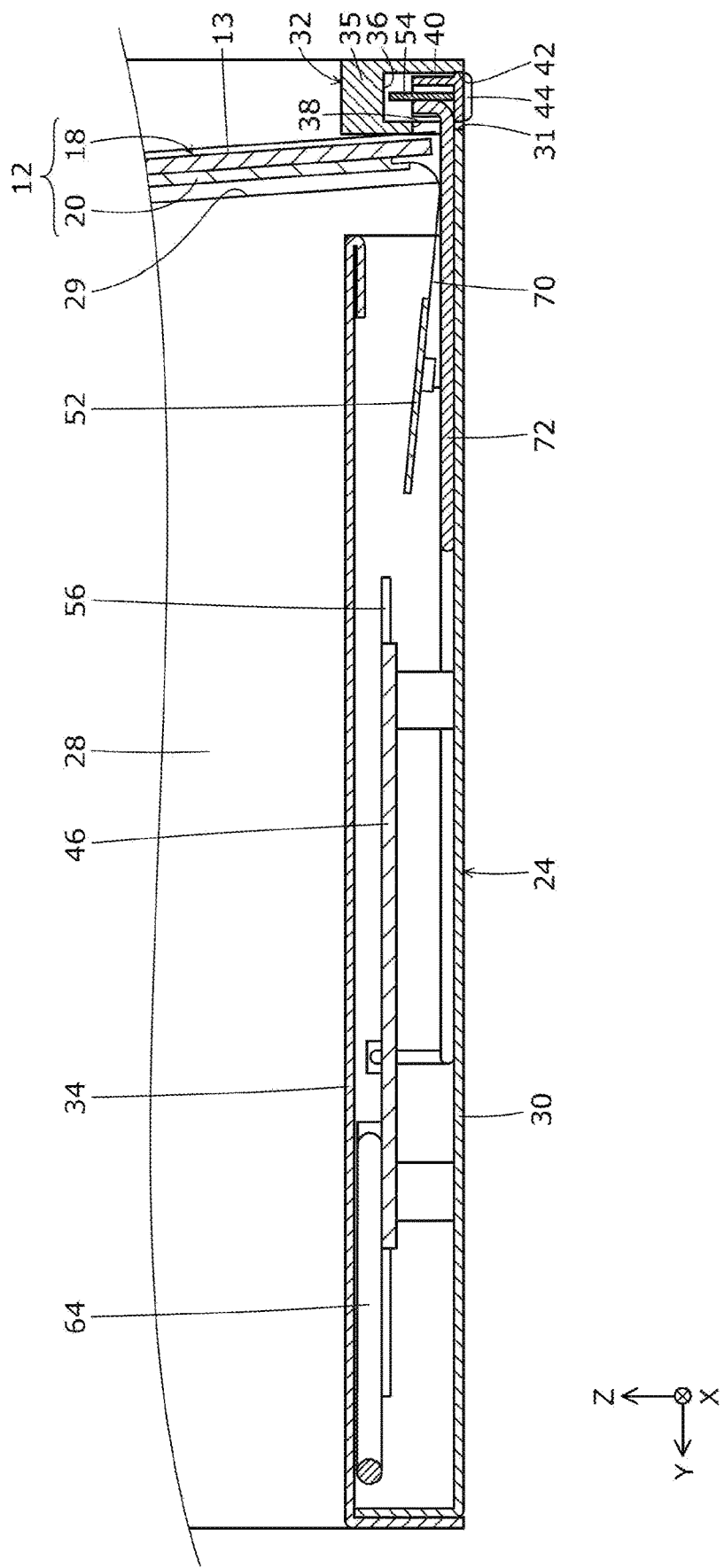
FIG. 6 is a cross-sectional view taken along line VI-VI in FIG. 5.

FIG. 1 is an external perspective view of a state of image display device 10 according to Embodiment 1 when operating in a first transmissive mode. FIG. 2 is an external perspective view of a state of image display device 10 according to Embodiment 1 when operating in an image display mode. FIG. 3 is an external perspective view of a state of image display device 10 according to Embodiment 1 when operating in a second transmissive mode. FIG. 4 is an exploded perspective view of a portion in proximity to lower plate 24 of image display device 10 according to Embodiment 1. FIG. 5 is a plan view of controller 16 of image display device 10 according to Embodiment 1. FIG. 6 is a cross-sectional view taken along line VI-VI in FIG. 5. Note that illustration of source board 52 and the like is omitted in FIG. 4 in order to prevent the drawing from becoming complicated. In addition, in order to facilitate understanding of the drawing, FIG. 5 omits illustration of cover 34 and the like and illustrates the lower edge of display panel 12 as a chained double-dashed line.

[Configuration of Image Display Device]

As illustrated in FIG. 1 and FIG. 4, image display device 10 according to the present embodiment includes display panel 12, housing 14, and controller 16. Image display device 10 is an image display device connectable to Wi-Fi (registered trademark) and the like via antenna unit 54 (to be described later) disposed in proximity to the lower edge of display panel 12. Each structural element will be described below.

(Display Panel)

As illustrated in FIG. 1 to FIG. 3, display panel 12 is a display device switchable between an image display mode in which an image is displayed on front surface 13 of display panel 12 and a transmissive mode in which display panel 12 is in a transmissive state where each of objects behind image display panel 12 is visible in the front view of display panel 12. Display panel 12 has a rectangular shape in the front view. Specifically, as illustrated in FIG. 6, display panel 12 is an organic electro-luminescent (EL) panel, and includes front glass plate 18 and organic light-emitting diode (OLED) panel 20 disposed behind front glass plate 18. In the present embodiment, organic EL elements, each of which includes an EL layer and transparent electrodes sandwiching the EL layer, are disposed in a matrix in OLED panel 20. The region of OLED panel 20 where an image (including background image) is not displayed has light transmitting properties to the extent generally referred to as transparent. Note that the "image" displayed on display panel 12 may be any of a still image or a moving image, or may be video content including both the still image and the moving image.

Display panel 12 becomes, for example, as illustrated in FIG. 1, a first transmissive mode, in which objects 200 behind display panel 12 are visible, by not displaying an image on display panel 12. Moreover, as illustrated in FIG. 2, display panel 12 becomes an image display mode by displaying image 202 on the entire region of the image display region of display panel 12. Moreover, as illustrated in FIG. 3, display panel 12 becomes a second transmissive mode in which objects 200 behind display panel 12 are visible while partial images 204 are displayed by displaying partial images 204 in a portion of the image display region of display panel 12. Moreover, display panel 12 may include, for example, an optical component, such as an anti-reflection film and a light adjusting panel, in addition to the above described structural elements. In the present embodiment, front surface 13 of display panel 12 is the front surface of front glass plate 18. Display panel 12 does not have to include front glass plate 18. In the case where display panel 12 does not include front glass plate 18, the front surface of display panel 12 is the front surface of OLED panel 20.

(Housing)

As illustrated in FIG. 1, housing 14 is disposed along the edge of display panel 12, and supports display panel 12. Housing 14 supports display panel 12 such that display panel 12 tilts slightly rearward. Housing 14 includes upper plate 22 disposed along the upper edge of display panel 12, lower plate 24 disposed along the lower edge of display panel 12, left plate 26 disposed along the left edge of display panel 12, and right plate 28 disposed along the right edge of display panel 12. Each of upper plate 22, lower plate 24, left plate 26, and right plate 28 has a plate shape. Each of upper plate 22, lower plate 24, left plate 26, and right plate 28 protrudes forward and rearward relative to display panel 12. Upper plate 22 and lower plate 24 are disposed parallel to each other, and left plate 26 and right plate 28 are disposed parallel to each other.

Upper plate 22 includes a groove (not illustrated) recessed upward. The upper edge of display panel 12 is accommodated in the groove.

As illustrated in FIG. 4 to FIG. 6, lower plate 24 includes bottom plate 30, front wall 32, and cover 34. Bottom plate 30 extends in the left-right direction. Controller 16 and the like are disposed on bottom plate 30. Bottom plate 30 includes notch 31 formed by notching the front edge of bottom plate 30. Notch 31 is recessed rearward in the front edge of bottom plate 30, and extends in the left-right direction. Notch 31 is positioned to the right of the central portion of bottom plate 30 in the left-right direction. Lid 40 (to be described later) is disposed on notch 31. Front wall 32 includes main body 35, accommodation unit 36, notch 38, and lid 40. Main body 35 extends in the left-right direction along the lower edge of display panel 12 in front of the lower edge of display panel 12, and is fixed to the front edge of bottom plate 30. In such a manner, main body 35 is disposed so as to protrude forward relative to the lower edge of display panel 12. Main body 35 is positioned in front of front surface 13 of display panel 12, and overlaps display panel 12 in the front-back direction. Specifically, main body 35 is positioned in front of the lower edge of front surface 13 of display panel 12, and overlaps the lower edge of display panel 12 in the front-back direction. Accommodation unit 36 is a portion which accommodates antenna unit 54. Accommodation unit 36 is positioned to the right of the central portion of main body 35 in the left-right direction. Accommodation unit 36 is opened in the bottom surface of main body 35, that is, is opened downward, and is recessed upward. Accommodation unit 36 is positioned above notch 31, and extends in the left-right direction along notch 31. Accommodation unit 36 is positioned to the right of the central portion of display panel 12 in the left-right direction. Accommodation unit 36 is positioned in front of front surface 13 of display panel 12, and overlaps display panel 12 in the front-back direction. Specifically, accommodation unit 36 is positioned in front of the lower edge of front surface 13 of display panel 12, and overlaps the lower edge of display panel 12 in the front-back direction. Notch 38 is a portion through which electric wire 72 (to be described later) which connects antenna unit 54 and communication board 56 (to be described later) passes. Notch 38 is disposed behind accommodation unit 36 and is formed by notching main body 35. Lid 40 is a component which supports antenna unit 54 from below. Lid 40 extends in the left-right direction, and is disposed on accommodation unit 36 so as to cover opening 42 of accommodation unit 36. Lid 40 is attached to main body 35 by two bolts 44. Cover 34 is disposed above bottom plate 30 so as to cover controller 16 and the like. The front edge of cover 34 is disposed spaced apart from front wall 32 in the front-back direction. Lower plate 24 accommodates the lower edge of display panel 12 by inserting the lower edge of display panel 12 between front wall 32 and the front edge of cover 34. One or more objects 200 (photo, doll, vase, toy, model, picture and the like) can be placed on the upper surface of cover 34. When display panel 12 operates in a transmissive mode, the user is capable of viewing objects 200 placed on the upper surface of cover 34 via display panel 12. The elements housed in lower plate 24 are not limited to controller 16. For example, a loudspeaker device, an exhaust fan, a television tuner, an optical disk player and the like which are not illustrated may be accommodated in lower plate 24.

Left plate 26 connects the left edge of upper plate 22 and the left edge of lower plate 24. Left plate 26 includes a groove (not illustrated) recessed toward the left. The left edge of display panel 12 is accommodated in the groove. Right plate 28 connects the right edge of upper plate 22 and the right edge of lower plate 24. Right plate 28 includes groove 29 recessed toward the right. The right edge of display panel 12 is accommodated in groove 29.

As the materials of upper plate 22, left plate 26, right plate 28, main body 35 and lid 40, for example, non-conductive materials such as wood or resin can be used. As the materials of bottom plate 30 and cover 34, for example, conductive materials such as metal can be used. In the present embodiment, front wall 32 corresponds to a non-conductive component, and front wall 32 forms part of housing 14.

(Controller)

As illustrated in FIG. 4 to FIG. 6, controller 16 is accommodated in lower plate 24 to control the operation of display panel 12. Controller 16 includes power supply board 46, signal board 48, T-con board 50, two source boards 52, antenna unit 54, and communication board 56. Antenna unit 54 is disposed in front of the lower edge of display panel 12. Power supply board 46, signal board 48, T-con board 50, two source boards 52, and communication board 56 are disposed behind the lower edge of display panel 12. Specifically, antenna unit 54 is disposed in front of the lower edge of front surface 13 of display panel 12. Power supply board 46, signal board 48, T-con board 50, two source boards 52, and communication board 56 are disposed behind the lower edge of front surface 13 of display panel 12.

Power supply board 46 is connected to an external power supply (not illustrated) via electric wire 58, is connected to signal board 48 via electric wire 60, and is connected to T-con board 50 via electric wire 62. Power supply board 46 supplies power from the external power supply to signal board 48, T-con board 50, and the like. Power supply board 46 is positioned to the right of the central portion of bottom plate 30 in the left-right direction.

Signal board 48 is connected to communication board 56 via electric wire 64 to transmit and receive signals to and from communication board 56. Signal board 48 is connected to T-con board 50 via electric wire 66 to transmit and receive signals to and from T-con board 50. Signal board 48 is positioned to the left of the central portion of bottom plate 30 in the left-right direction.

T-con board 50 forms so-called a timing controller, and is connected to two source boards 52 via flexible printed boards 68. T-con board 50 generates various types of signals, such as a clock signal for distributing image data to be displayed on display panel 12 to each pixel included in display panel 12, and supplies the signals to source boards 52. T-con board 50 is positioned in the central portion of bottom plate 30 in the left-right direction.

Two source boards 52 are connected to display panel 12 via flexible printed boards 70, to supply a signal from T-con board 50 to display panel 12. Two source boards 52 are disposed adjacent to each other, and in front of power supply board 46, signal board 48, T-con board 50, and communication board 56.

Antenna unit 54 is connected to communication board 56 via electric wire 72. Antenna unit 54 transmits and receives radio waves used by communication board 56 and another communication apparatus (not illustrated) for performing communication in accordance with Wi-Fi (registered trademark) standard. Antenna unit 54 extends in the left-right direction, and has a plate shape. Antenna unit 54 is accommodated in accommodation unit 36 while projecting in the top-bottom direction, and is disposed in proximity to the lower edge of display panel 12. Antenna unit 54 is positioned to the right of the central portion of main body 35 in the left-right direction and is positioned to the right of the central portion of display panel 12 in the left-right direction. Antenna unit 54 is positioned in front of front surface 13 of display panel 12, and overlaps display panel 12 in the front-back direction. Specifically, antenna unit 54 is positioned in front of the lower edge of front surface 13 of display panel 12, and overlaps the lower edge of display panel 12 in the front-back direction. Antenna unit 54 is entirely positioned in front of the lower edge of front surface 13 of display panel 12. Antenna unit 54 is supported by lid 40 from below. The front, top, left, and right of antenna unit 54 are covered by main body 35, and the bottom of antenna unit 54 is covered by lid 40. Antenna unit 54 does not have to be entirely positioned in front of the lower edge of front surface 13 of display panel 12. For example, at least a portion of antenna unit 54 may be positioned in front of the lower edge of front surface 13 of display panel 12. As the material of antenna unit 54, for example, a conductive material such as metal can be used. Specifically, for example, antenna unit 54 includes a metal component and a resin which covers at least a portion of the metal component.

Communication board 56 performs communication with another communication apparatus via antenna unit 54. Communication board 56 also transmits and receives a signal to and from signal board 48. Communication board 56 is positioned to the right of the central portion of bottom plate 30 in the left-right direction, and is positioned slightly closer to the central portion than the right edge of bottom plate 30 is. Communication board 56 is positioned to the right of the central portion of display panel 12 and antenna unit 54 in the left-right direction.

Advantageous Effects, Etc.

As described above, image display device 10 according to the present embodiment includes: display panel 12 which displays an image on front surface 13 of display panel 12; antenna unit 54 disposed in front of front surface 13 of display panel 12; and front wall 32 which accommodates antenna unit 54.

With such a configuration, antenna unit 54 is positioned in front of front surface 13 of display panel 12. Accordingly, for example, even when image display panel 10 is disposed near the wall, it is possible to prevent the radio waves received by antenna unit 54 from being blocked by the wall. This leads to improved reception performance of antenna unit 54. Moreover, antenna unit 54 is accommodated in accommodation unit 36 of front wall 32. Accordingly, compared with the case where antenna unit 54 is accommodated in a conductive component, it is possible to prevent the sensitivity of antenna unit 54 from decreasing. This leads to improved reception performance of antenna unit 54. Moreover, this prevents antenna unit 54 from being seen by the user, and improves the appearance of image display device 10. In addition, it prevents the user from directly touching antenna unit 54, which leads to improved safety.

Image display device 10 according to the present embodiment further includes communication board 56 which is disposed behind display panel 12 and which is capable of performing communication with antenna unit 54.

With this configuration, communication board 56 is disposed behind display panel 12. Accordingly, it is possible to improve the reception performance of antenna unit 54 while preventing communication board 56 from being seen by the user in front of display panel 12.

Moreover, in image display device 10 according to the present embodiment, front wall 32 includes accommodation unit 36 which is opened downward and which accommodates antenna unit 54, and lid 40 which is disposed on accommodation unit 36.

With such a configuration, accommodation unit 36 is opened downward. Hence, it is possible to improve the reception performance of antenna unit 54 while preventing antenna unit 54 and lid 40 from being seen by the user in front of display panel 12.

Image display device 10 according to the present embodiment further includes housing 14 disposed along the edge of display panel 12. Front wall 32 forms part of housing 14.

With such a configuration, front wall 32 forms part of housing 14. Hence, antenna unit 54 can be accommodated without separately providing a component for accommodating antenna unit 54.

The function and effect described above can also be obtained in a similar manner in Embodiment 2 to be described later.

Moreover, in image display device 10 according to the present embodiment, antenna unit 54 is disposed so as to overlap display panel 12 in the front-back direction.

With such a configuration, compared with the case where antenna unit 54 does not overlap display panel 12 in the front-back direction, it is possible to improve the reception performance of antenna unit 54 while preventing the size of image display device 10 from increasing in the top-bottom direction and the left-right direction.

In image display device 10 according to the present embodiment, front wall 32 is disposed along the lower edge of display panel 12, and protrudes forward relative to display panel 12.

With such a configuration, antenna unit 54 can be positioned in proximity to the lower edge of display panel 12. Hence, it is possible to improve the reception performance of antenna unit 54 while preventing the image displayed on display panel 12 from becoming difficult to be viewed due to overlapping with antenna unit 54.

Embodiment 2

Next, Embodiment 2 will be described.

Figure 7:
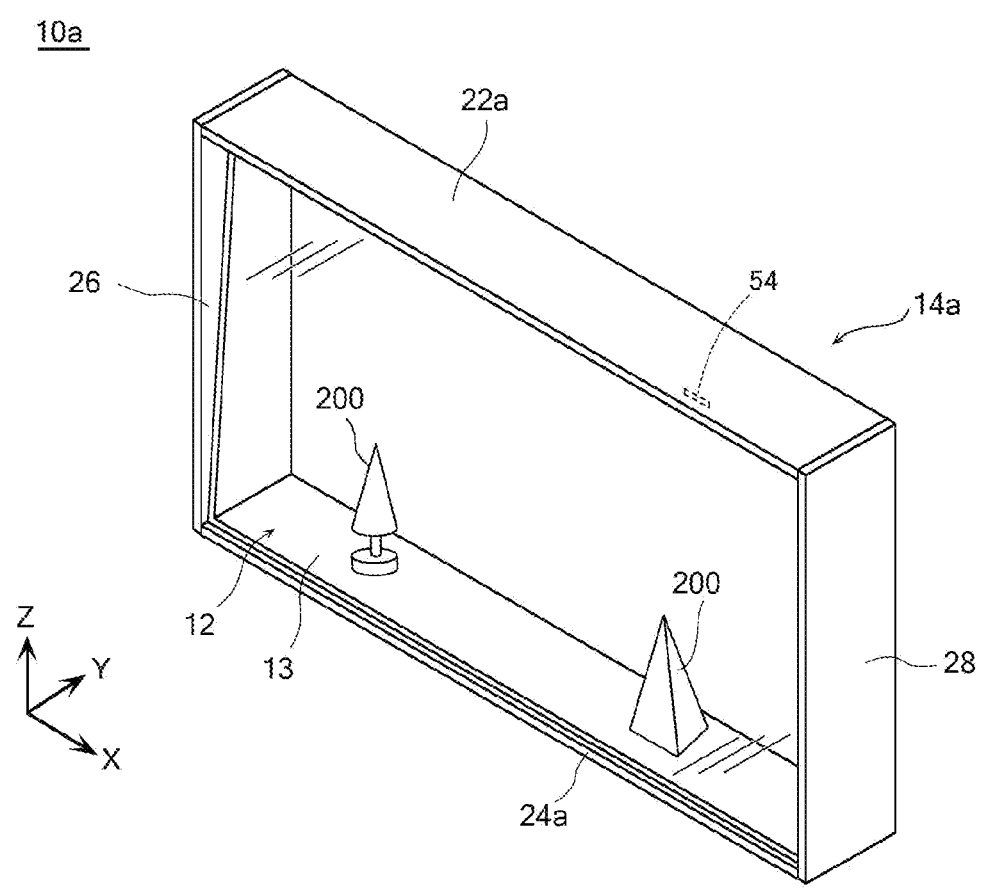
FIG. 7 is an external perspective view of a state of an image display device according to Embodiment 2 when operating in a first transmissive mode.
Figure 8:
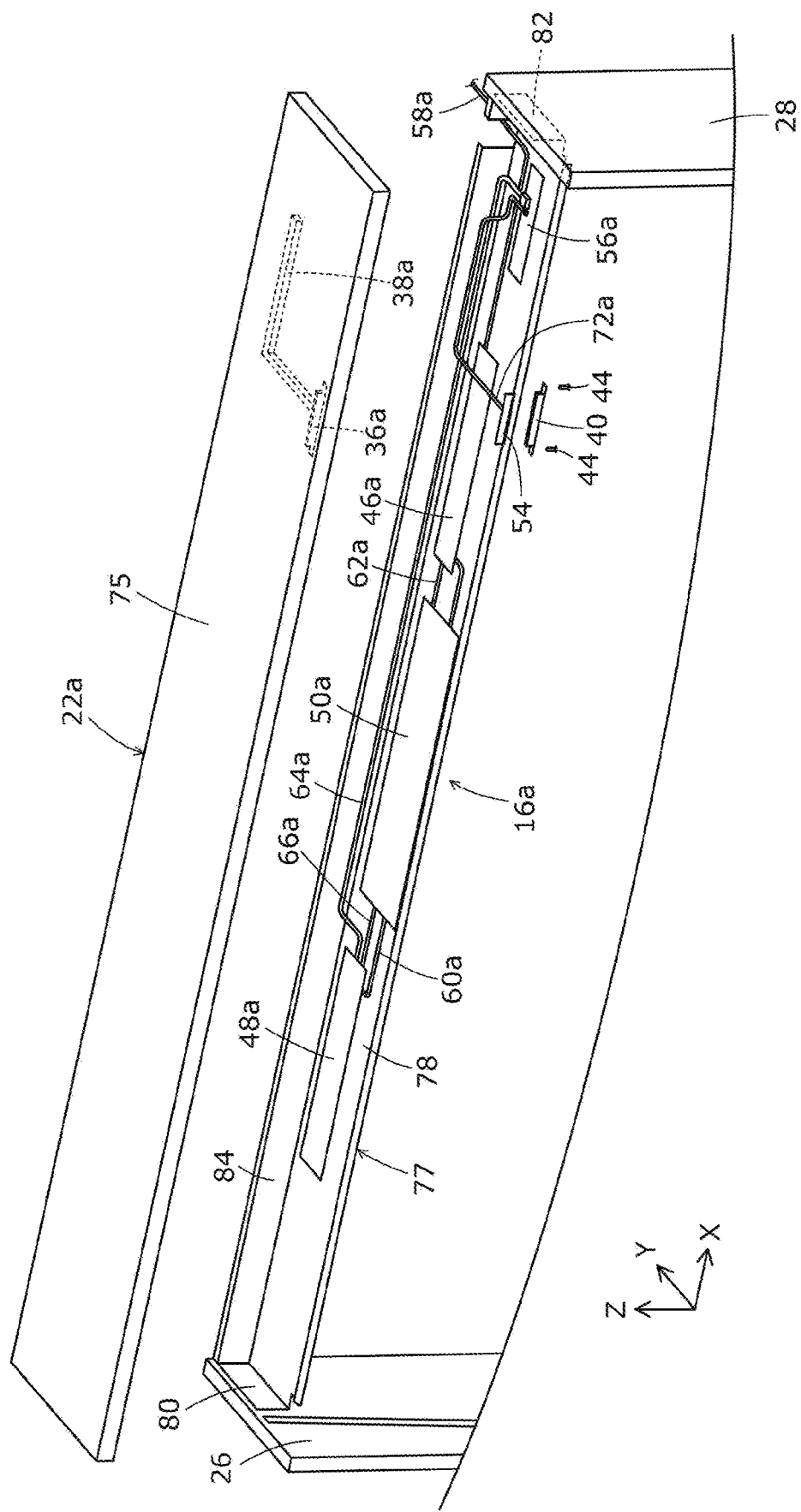
FIG. 8 is an exploded perspective view of a portion in proximity to an upper plate of the image display device according to Embodiment 2.
Figure 9:
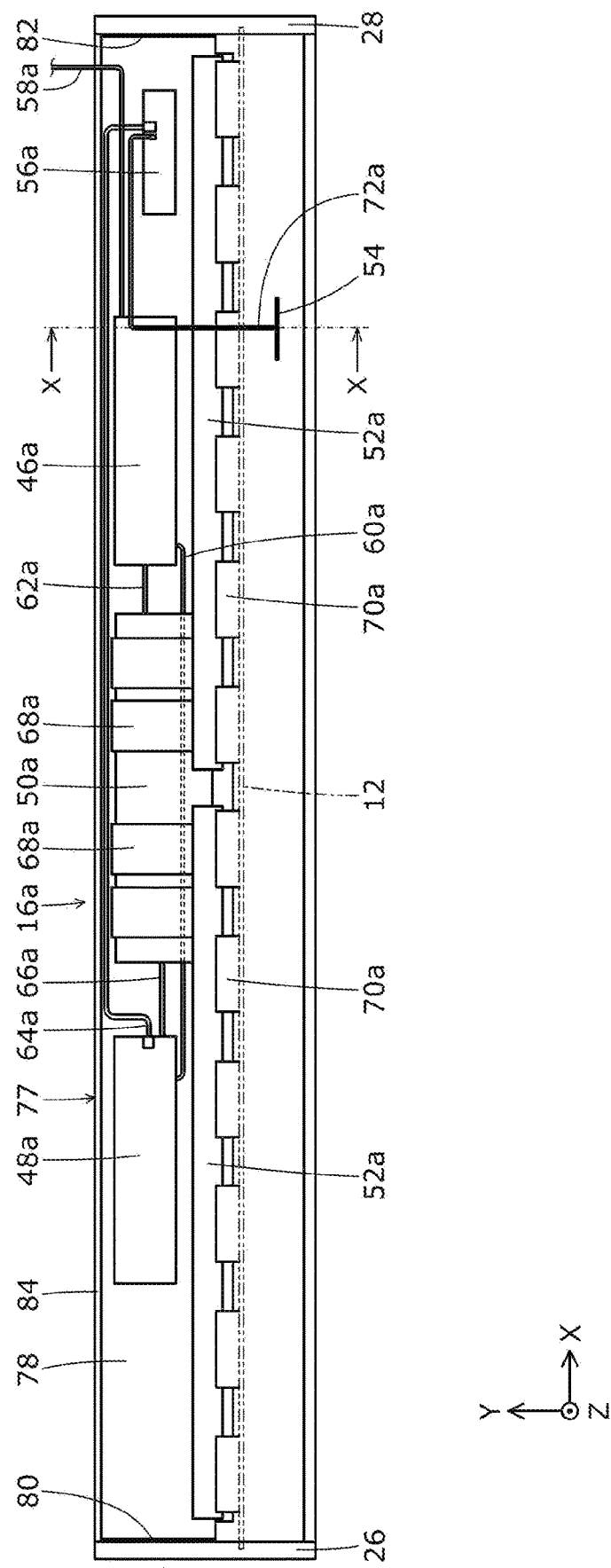
FIG. 9 is a plan view of a controller of the image display device according to Embodiment 2.
Figure 10:
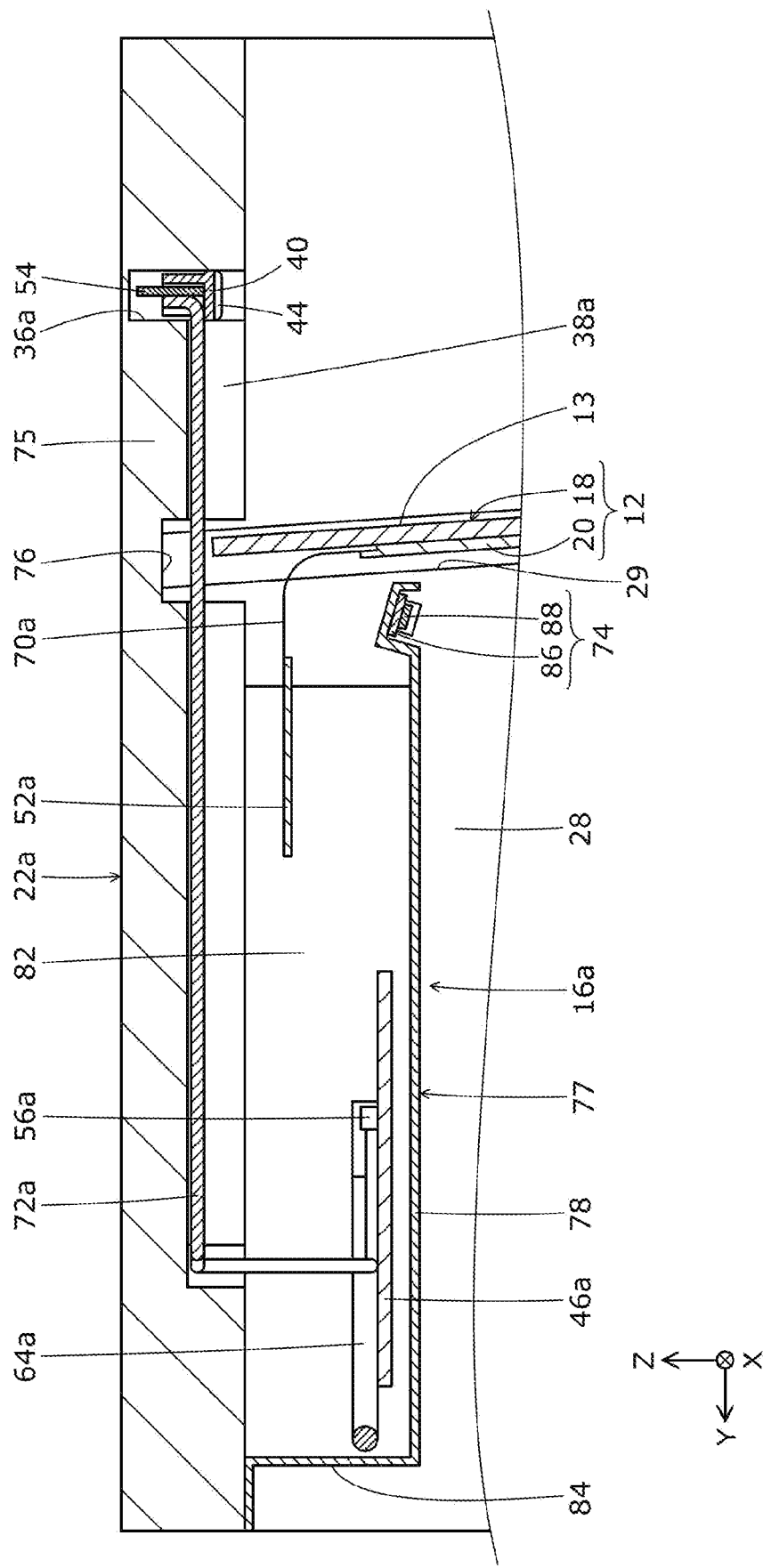
FIG. 10 is a cross-sectional view taken along line X-X in FIG. 9.

FIG. 7 is an external perspective view of a state of image display device 10a according to Embodiment 2 when operating in a first transmissive mode. FIG. 8 is an exploded perspective view of a portion in proximity to upper plate 22a of image display device 10a according to Embodiment 2. FIG. 9 is a plan view of controller 16a of image display device 10a according to Embodiment 2. FIG. 10 is a cross-sectional view taken along line X-X in FIG. 9. Note that illustration of source boards 52a and the like is omitted in FIG. 8 in order to prevent the drawing from becoming complicated. In addition, in order to facilitate understanding of the drawing, FIG. 9 omits illustration of upper plate 22a and the like and illustrates the upper edge of display panel 12 as a chained double-dashed line.

[Configuration of Image Display Device]

As illustrated in FIG. 7 to FIG. 10, image display device 10a according to the present embodiment includes: display panel 12; housing 14a; controller 16a; and illumination unit 74. Image display device 10a is an image display device connectable to Wi-Fi (registered trademark) or the like via antenna unit 54 disposed in proximity to the upper edge of display panel 12. Each structural element will be described below. In the following description, the differences from image display device 10 according to Embodiment 1 will be mainly described. Detailed description of display panel 12 is omitted by referring to the description given in Embodiment 1.

(Housing)

As illustrated in FIG. 7, housing 14a includes upper plate 22a, lower plate 24a, left plate 26, and right plate 28. Each of upper plate 22a, lower plate 24a, left plate 26, and right plate 28 protrudes forward and rearward relative to display panel 12.

As illustrated in FIG. 8 to FIG. 10, upper plate 22a includes main body 75 and groove 76. Main body 75 extends in the left-right direction, and is disposed along the upper edge of display panel 12. Main body 75 protrudes forward and rearward relative to display panel 12. Main body 75 is positioned in front of front surface 13 of display panel 12, and overlaps display panel 12 in the front-back direction. Specifically, main body 75 is positioned in front of the upper edge of front surface 13 of display panel 12, and overlaps the upper edge of display panel 12 in the front-back direction. Groove 76 is a groove in which the upper edge of display panel 12 is accommodated. Groove 76 is opened in the bottom surface of main body 75, that is, opened downward and recessed upward. Groove 76 extends along the upper edge of display panel 12 in the left-right direction. Upper plate 22a includes accommodation unit 36a, groove 38a, and lid 40. Accommodation unit 36a is a portion for accommodating antenna unit 54. Accommodation unit 36a is positioned to the right of the central portion of main body 75 in the left-right direction. Accommodation unit 36a is opened in the bottom surface of main body 75, that is, is opened downward, and is recessed upward. Accommodation unit 36a extends in the left-right direction. Accommodation unit 36a is positioned to the right of the central portion of display panel 12 in the left-right direction. Accommodation unit 36a is positioned in front of front surface 13 of display panel 12, and overlaps display panel 12 in the front-back direction. Specifically, accommodation unit 36a is positioned in front of the upper edge of front surface 13 of display panel 12, and overlaps the upper edge of display panel 12 in the front-back direction. Groove 38a is a portion through which electric wire 72a (to be described later) which connects antenna unit 54 and communication board 56a (to be described later) passes. Groove 38a is opened in the bottom surface of main body 75, that is, is opened downward, and is recessed upward. Groove 38a is in communication with accommodation unit 36a. Groove 38a extends rearward from accommodation unit 36a, and then extends toward the right. Lid 40 is a component which supports antenna unit 54 from below, and is disposed on accommodation unit 36a. Lid 40 is attached to main body 75 by two bolts 44.

Lower plate 24a includes a groove (not illustrated) recessed downward. The lower edge of display panel 12 is accommodated in the groove. Detailed descriptions of left plate 26 and right plate are omitted by referring to the descriptions given in Embodiment 1.

As the materials of main body 75, lid 40, lower plate 24a, left plate 26, and right plate 28, for example, non-conductive materials such as wood or resin can be used. In the present embodiment, upper plate 22a corresponds to the non-conductive component and upper plate 22a forms part of housing 14.

(Controller)

As illustrated in FIG. 8 to FIG. 10, controller 16a is supported by upper plate 22a on the lower surface side of upper plate 22a, and controls the operations of display panel 12 and illumination unit 74. Controller 16a includes power supply board 46a, signal board 48a, T-con board 50a, two source boards 52a, antenna unit 54, communication board 56a, and support 77. Detailed descriptions of power supply board 46a, signal board 48a, T-con board 50a, and two source boards 52a are omitted by referring to the descriptions given in Embodiment 1.

Antenna unit 54 is connected to communication board 56a via electric wire 72a. Antenna unit 54 transmits and receives radio waves used by communication board 56 and another communication apparatus (not illustrated) for performing communication in accordance with Wi-Fi (registered trademark) standard. Antenna unit 54 extends in the left-right direction, and has a plate shape. Antenna unit 54 is accommodated in accommodation unit 36a while projecting in the top-bottom direction, and is disposed in proximity to the upper edge of display panel 12. Antenna unit 54 is positioned to the right of the central portion of main body 75 in the left-right direction and is positioned to the right of the central portion of display panel 12 in the left and right direction. Antenna unit 54 is positioned in front of front surface 13 of display panel 12. Specifically, antenna unit 54 is positioned in front of the upper edge of front surface 13 of display panel 12. Antenna unit 54 is entirely positioned in front of the upper edge of front surface 13 of display panel 12. Antenna unit 54 is supported by lid 40 from below. The front, top, left, and right of antenna unit 54 are covered by main body 75, and the bottom of antenna unit 54 is covered by lid 40. When display panel 12 is supported so as to tilt rearward and antenna unit 54 is disposed in proximity to the upper edge of display panel 12 as in the present embodiment, antenna unit 54 only has to be positioned at least in front of the upper edge of front surface 13 of display panel 12, and may be positioned behind the lower edge of front surface 13 of display panel 12. Antenna unit 54 does not have to be entirely positioned in front of the upper edge of front surface 13 of display panel 12. For example, at least a portion of antenna unit 54 may be positioned in front of the upper edge of front surface 13 of display panel 12. Moreover, antenna unit 54 may overlap display panel 12 in the front-back direction. Specifically, antenna unit 54 may overlap the upper edge of display panel 12 in the front-back direction. As the material of antenna unit 54, for example, a conductive material such as metal can be used. Specifically, for example, antenna unit 54 includes a metal component and a resin which covers at least a portion of the metal component.

Communication board 56a performs communication with another communication apparatus via antenna unit 54. Communication board 56a also transmits and receives a signal to and from signal board 48a. Communication board 56a is positioned to the right of the central portion of support 77 in the left-right direction, and is positioned slightly closer to the central portion than the right edge of support 77 is. Communication board 56a is positioned to the right of the central portion of display panel 12 and is positioned to the right of antenna unit 54 in the left-right direction.

Support 77 extends in the left-right direction, is attached to the bottom surface of upper plate 22a, and connects left plate 26 and right plate 28. Support 77 includes bottom portion 78, left portion 80, right portion 82, and back portion 84. Bottom portion 78 extends in the left-right direction, has a plate shape, and is disposed substantially parallel to upper plate 22a. The front edge of bottom portion 78 has a cross-section with a substantial reverse U shape (see FIG. 10). Illumination unit 74 is supported by the front edge of bottom portion 78. Left portion 80 protrudes upward from the left edge of bottom portion 78, and is disposed along left plate 26. Left portion 80 is fixed to left plate 26 by bolts (not illustrated). Right portion 82 protrudes upward from the right edge of bottom portion 78, and is disposed along right plate 28. Right portion 82 is fixed to right plate 28 by bolts (not illustrated). Left portion 80 is fixed to left plate 26 and right portion 82 is fixed to right plate 28, so that support 77 connects left plate 26 and right plate 28. Back portion 84 protrudes upward from the rear edge of bottom portion 78. The upper edge of rear portion 84 is folded rearward, and is fixed to upper plate 22a by bolts (not illustrated). As the material of support 77, for example, a conductive material such as metal can be used.

(Illumination Unit)

As illustrated in FIG. 10, illumination unit 74 is disposed on the front edge of bottom portion 78 of support 77, and is electrically connected to controller 16a by electric wires (not illustrated). As described above, minute light shielding elements, such as organic EL elements and liquid crystals, are dispersed in display panel 12. Hence, even when display panel 12 operates in the transmissive mode, the light transmittance of display panel 12 is, for example, 40% to 50% approximately. Accordingly, for example, when image display device 10a is placed in a relatively dark environment, the user may fail to clearly view objects 200 behind display panel 12. However, objects 200 behind display panel 12 can be illuminated by the light emitted by illumination unit 74.

Illumination unit 74 is embedded in the front edge of bottom portion 78. Accordingly, when display panel 12 is turned into a transmissive state, it is possible to prevent the light emitted from illumination unit 74 from directly entering the eyes of the user in front of image display device 10a. Illumination unit 74 includes board 86 elongated in the left-right direction and a plurality of LED elements 88 which are mounted on board 86 and which emit light. One or more objects 200 placed on lower plate 24a are illuminated by illumination unit 74 configured as above.

Advantageous Effects, Etc.

As described above, in image display device 10a according to the present embodiment, upper plate 22a is disposed along the upper edge of display panel 12, and protrudes forward relative to display panel 12.

With such a configuration, antenna unit 54 can be positioned in proximity to the upper edge of display panel 12. Hence, it is possible to improve the reception performance of antenna unit 54 while preventing the image displayed on display panel 12 from becoming difficult to be viewed due to overlapping with antenna unit 54.

Other Embodiments, Etc.

As described above, embodiments have been described as examples of the technique disclosed in the present application. However, the technique according to the present disclosure is not limited to these examples, and is also applicable to embodiments to which various kinds of modifications, replacements, additions, omissions and the like have appropriately been made. Moreover, each structural element described in the above embodiments may be combined to obtain a new embodiment. Another embodiment will be described below as an example.

Figure 11:
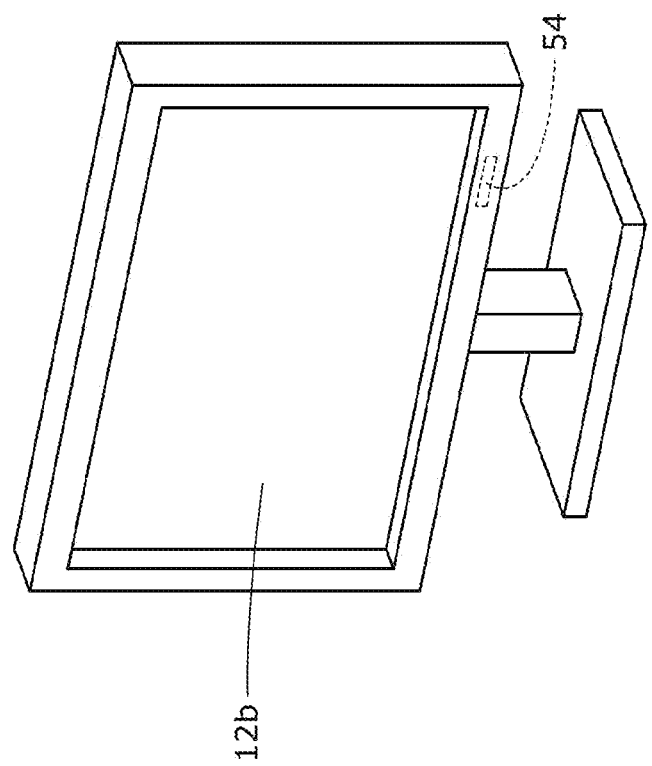
FIG. 11 is a perspective view of an image display device according to another embodiment.

In the embodiments described above, the case has been described where display panel 12 is switchable between an image display mode in which an image is displayed on front surface 13 and a transmissive mode in which display panel 12 is in a transmissive state where an object behind display panel 12 is visible in a front view of display panel 12. However, the present disclosure is not limited to such an example. For example, display panel 12b may be a liquid crystal panel or the like which is not capable of switching between the image display mode and the transmissive mode. In such a case, antenna unit 54 only has to be positioned in front of the front surface of display panel 12b (see FIG. 11).

In the embodiments described above, the cases have been described where antenna unit 54 is accommodated in lower plate 24 disposed along the lower edge of display panel 12 and where antenna unit 54 is accommodated in upper plate 22a disposed along the upper edge of display panel 12. However, the present disclosure is not limited to such examples. For example, antenna unit 54 may be accommodated in left plate 26 disposed along the left edge of display panel 12, or may be accommodated in right plate 28 disposed along the right edge of display panel 12.

In the embodiments described above, the cases have been described where antenna unit 54 and accommodation unit 36 are positioned to the right of the central portion of display panel 12 in the left-right direction and where antenna unit 54 and accommodation unit 36a are positioned to the right of the central portion of display panel 12 in the left-right direction. However, the present disclosure is not limited to such examples. For example, the antenna unit and the accommodation unit may be positioned in the central portion of display panel 12 in the left-right direction, or may be positioned to the left of the central portion of display panel 12 in the left-right direction.

In the embodiments described above, the cases have been described where housing 14 includes upper plate 22, lower plate 24, left plate 26, and right plate 28 each of which has a plate shape and where housing 14a includes upper plate 22a, lower plate 24a, left plate 26, and right plate 28 each of which has a plate shape. However, the present disclosure is not limited to such examples. For example, the housing may include an upper frame, a lower frame, a left frame, and a right frame each of which has a prism shape.

In the embodiments described above, the case has been described where housing 14 supports display panel 12 so that display panel 12 tilts slightly rearward. However, the present disclosure is not limited to such an example. For example, the housing may support display panel 12 such that display panel 12 does not tilt in the front-back direction.

In the embodiments described above, the case has been described where antenna unit 54 has a plate shape. However, the present disclosure is not limited to such an example. For example, the antenna unit may have a bar shape, cylinder shape, or columnar shape. Moreover, for example, the antenna unit may have a meander shape.

As described above, embodiments have been described as examples of the technique disclosed in the present application. For this purpose, the accompanying drawings and detailed description are provided.

Accordingly, the structural elements described in the accompanying drawings and detailed description may include not only structural elements which are essential for solving the problem but also structural elements which are not essential for solving the problem but are provided for illustrating the technique. Therefore, the non-essential structural elements described in the attached drawings and/or the detailed description should not be instantly acknowledged to be essential structural elements.

Since the above embodiments are intended to illustrate the technique in the present disclosure, it is possible to make various kinds of modifications, replacements, additions, omissions, and the like within the scope of the claims or an equivalent scope thereof.

INDUSTRIAL APPLICABILITY

The present disclosure is applicable to an image display device, such as a television receiver, a monitor display, or a digital signage.

The invention claimed is:

1. An image display device, comprising:
a display panel which displays an image on a front surface of the display panel;
an antenna unit which is positioned in front of the front surface of the display panel; and
a housing which supports the display panel and the antenna unit, wherein:
the housing includes a non-conductive component which accommodates the antenna unit,
the antenna unit is disposed along an edge of the display panel in the housing and overlaps the edge at a lower end of the display panel in a front-back direction,
the housing includes a lower plate that is disposed along the edge at the lower end of the display panel and is fixed in an orientation in which a thickness direction of the lower plate intersects the front-back direction,
the lower plate includes a plate-shaped portion that protrudes forward relative to the display panel and a portion that protrudes rearward relative to the display panel,
the antenna unit is arranged within a thickness of the plate-shaped portion of the lower plate that protrudes forward, and
a thickness direction of the plate-shaped portion intersects the front-back direction.

2. The image display device according to claim 1, wherein the non-conductive component protrudes forward relative to the display panel.

3. The image display device according to claim 1, further comprising:
a communication board which is disposed behind the display panel, and is configured to perform communication with the antenna unit.

4. The image display device according to claim 1, wherein the non-conductive component includes an accommodation unit and a lid, the accommodation unit being opened downward and accommodating the antenna unit, the lid being disposed on the accommodation unit.

5. The image display device according to claim 1, wherein the housing is disposed along an edge of the display panel.

6. An image display device, comprising:
a display panel which displays an image on a front surface of the display panel;
an antenna unit which is positioned in front of the front surface of the display panel; and
a non-conductive component which accommodates the antenna unit, wherein:
the non-conductive component includes an accommodation unit and a lid,
the accommodation unit includes an opening that opens downward and accommodates the antenna unit,
the lid is disposed on the opening of the accommodation unit,
the antenna unit is supported by the lid and accommodated inside the accommodation unit, and
the lid supports the antenna unit from below the antenna unit.

* * * * *